CONTROL CIRCUIT

Filed Nov. 5, 1965 6 Sheets-Sheet 1

INVENTOR.
William F. Joy,
BY
Byron, Hume, Groen + Clement
Attys

CONTROL CIRCUIT

INVENTOR.
William F. Joy,
BY
Byron, Hume, Groen & Clement
Attys.

July 25, 1967 W. F. JOY 3,332,639

CONTROL CIRCUIT

Filed Nov. 5, 1965 6 Sheets-Sheet 3

Inventor:
William F Joy,
By Hume, Groen, Clement & Hume
Attys

CONTROL CIRCUIT

Filed Nov. 5, 1965

Inventor:
William F. Joy,
By Hume, Groen, Clement & Hume
Attys.

July 25, 1967 W. F. JOY 3,332,639

CONTROL CIRCUIT

Filed Nov. 5, 1965 6 Sheets-Sheet 5

Inventor:
William F. Joy,
By Hume, Groen, Clement & Hume
attys

Inventor:
William F. Joy,
By Hume, Groen, Clement & Hume.
Attys.

United States Patent Office 3,332,639

Patented July 25, 1967

3,332,639

CONTROL CIRCUIT

William F. Joy, Mount Prospect, Ill., assignor to The Powers Regulator Company, Skokie, Ill., a corporation of Illinois Filed Nov. 5, 1965, Ser. No. 513,633

8 Claims. (Cl. 243—16)

This invention relates to control circuits and more particulary to a circuit for controlling the selective actuation of the path-defining instrumentalities in a pneumatic tube system.

This application is a continuation-in-part of co-pending application Serial No. 295,126, filed July 15, 1963.

The use of multi-station pneumatic tube systems in banks, stores, offices, and the like has become increasingly more prevalent. When employing such a pneumatic system to transmit information or message carriers to various remote locations, suitable path-defining instrumentalities are selectively rendered effective to direct the carriers to the desired destinations. In this connection, a main pneumatic tube or conduit connected to an input station may communicate with a plurality of secondary tubes or branch conduits so that information carriers introduced at the input station can be selectively directed to any of a number of different destinations.

Therefore, it has proven desirable in such multi-section pneumatic tube systems to employ information carriers that can be readily designated for transmission from an input station to one of several remote destinations. One suitable carrier construction for this purpose is disclosed and claimed in the co-pending application of the common assignee Serial No. 243,276, which was filed on Dec. 10, 1962. In general, this carrier construction employs dual magnetic elements that are selectively arranged to induce signals in sensing coils suitable mounted adjacent the path of travel of the carrier. Alternatively, information or message carriers have been constructed with suitable spaced and electrically connected metallic bands provided about the exterior surface of the carrier. When the carrier passes appropriately spaced brushes or sensing elements located adjacent the path of travel of the carrier, a contact closure is effected and a signal corresponding thereto is produced. The signals produced by these and other forms of signalling devices employed in multi-station pneumatic tube systems are utilized to actuate suitable path-defining instrumentalities within the system that direct the carriers to the desired destinations. It is therefore desirable to provide a versatile control circuit which is responsive to signals produced by various information carrier signalling devices such as those described above. Such a control circuit should be capable of quickly and reliably rendering the path-defining instrumentalities within the pneumatic tube system effective so that the proper transmission of information carriers to selected destination is assured.

Accordingly, it is a prime object of the present invention to provide an improved control circuit for use in a pneumatic tube system.

Still another object of the invention is to provide a circuit for controlling the path-defining instrumentalities of a pneumatic tube system in response to signals produced by a variety of different information carrier signalling devices.

A further object of the present invention is to provide a control circuit for pneumatic tube system, which circuit is relatively low in cost and simple in construction as well as versatile and reliable in operation.

Other objects and advantages of the present invention will become apparent from the following description thereof when considered in conjunction with the accompanying drawings wherein.

In general, the present invention is directed to an improved control circuit for use with a pneumatic tube system to insure that carriers advancing through the system are directed to the desired destinations. The control circuit is versatile so that signals produced by a number of different information carrier signalling devices can be sensed, amplified, and supplied by the control circuit to actuate suitable path-defining instrumentalities within the pneumatic tube system.

In this connection, the control circuit can, for example, be employed with an information carrier signalling device that produces a signal corresponding to the closure of a pair of spaced apart contacts. Alternatively, the control circuit can be employed with a signalling device that produces a signal in response to the coincident passage of dual magnetic element structures relative to a pair of spaced apart coils. In either case, the signal generated by the passage of an information carrier through the system is fed through a suitable input circuit to a multivibrator circuit. The input signal causes the multivibrator to change conductive states, and an output signal is produced by the multivibrator which is amplified and supplied to the path-defining instrumentalities employed in the pneumatic tube system.

For example, the amplified signal produced at the output of the control circuit may effect the energization of a suitable solenoid. In such a case, the solenoid can be employed to advance a gate structure into the path of travel of an information carrier in one tube of the system and thereby shunt the carrier into another tube which communicates with the desired carrier destination.

Figures 1, 2, 3:
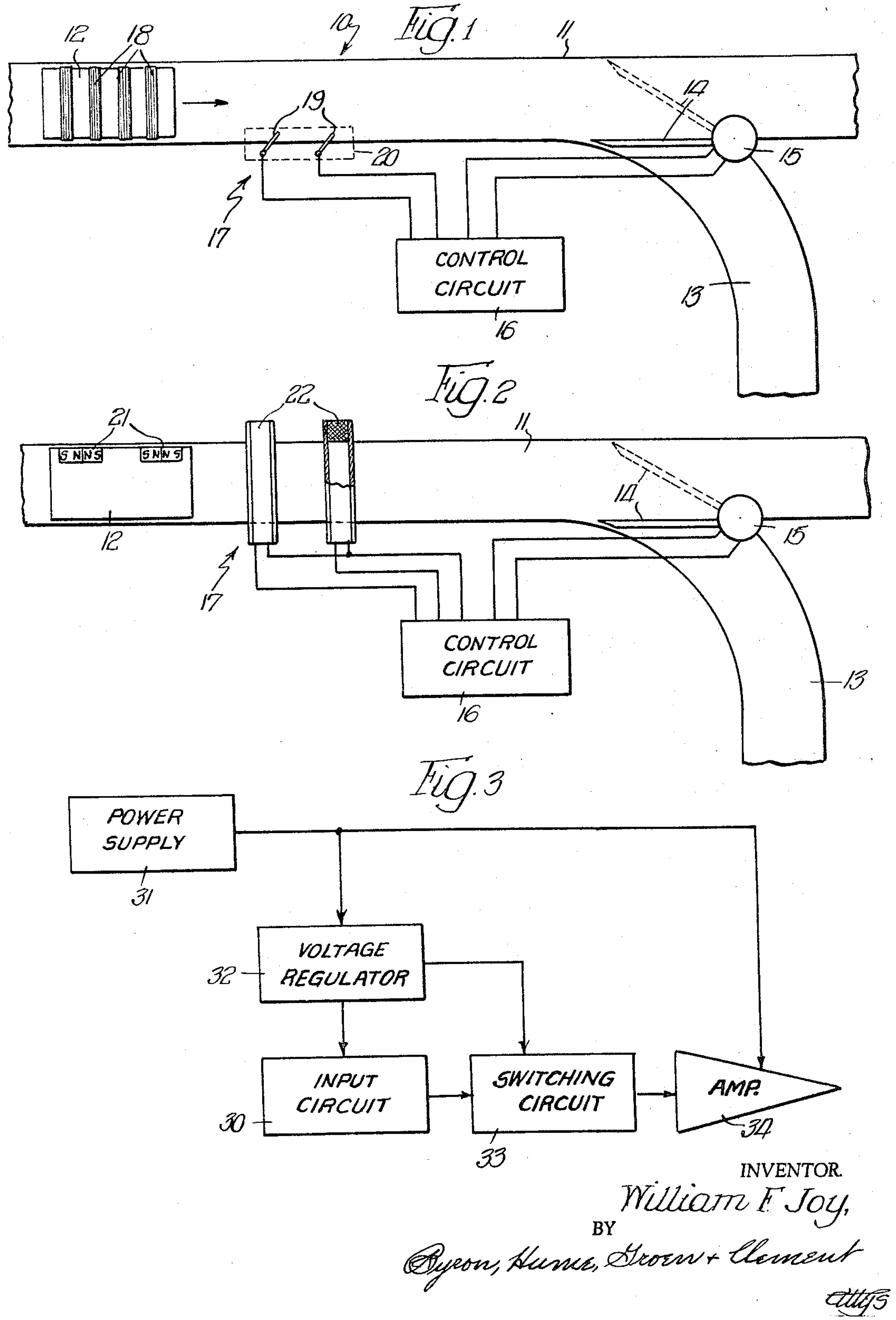
FIGURE 1 is a diagrammatic illustration of a portion of a pneumatic tube system of the type wherein the control circuit of the present invention can be employed.
FIGURE 2 is a diagrammatic illustration of a portion of another type of pneumatic tube system wherein the control circuit of the present invention can also be employed.
FIGURE 3 is a block diagram which illustrates the major components of the control circuit of the present invention.

Referring in particular to FIGURES 1 and 2, a portion 10 of a pneumatic carrier system is shown as including a main carrier advancing tube or conduit 11 wherethrough an information or message carrier 12 is advanced in accordance with the conventional operational mode of such a system. A second or branch tube 13 communicates with the main tube 11 so that a carrier 12 being advanced through the latter can, if desired, be shunted to the second tube by the actuation of a gate member 14 into the path of travel of the carrier, as shown in dotted outline.

In a conventional manner, the operation of the gate 14 is effected by a suitable pneumatic motor or the like (not shown) that is actuated by a solenoid 15. The energization of the solenoid 15 is dictated by a control circuit 16 in response to an input signal supplied to the control circuit by one or more types of information carrier signalling devices 17.

In the embodiment illustrated in FIGURE 1, the carrier 12 is provided with a plurality of spaced-apart metallic bands 18 that are mounted about the periphery of the carrier. The bands 18 constitute the actuating elements of the signalling device 17. In a conventional manner, a selected pair of the metal bands 18 is joined together by an additional metallic member (not shown) provided on the inner surface of the carrier wall. The bands 18 forming the connected pair on selected ones of the carriers which are to be shunted to the branch tube 13 are spaced apart a distance that complements the spacing of a pair of contacts or brushes 19 that are mounted within a suitable housing 20 adjacent the path of travel of the carriers. Preferably, the housing and associated sensing elements are mounted on the inner wall of the tube 11 at a location suitably spaced from the junction of this tube with the branch tube 13.

As a carrier 12, which is to be shunted to the branch tube 13, passes the spaced-apart contacts 19, these contacts instantaneously and simultaneously engage the connected bands 18, the preselected spacing of which dictates the desired shunting operation. As a result, the contacts are shunted together via the additional metallic member which joins the bands 18. As hereinafter fully described, the short circuiting of the contacts 19 effectively serves as a switch closure that results in an input signal being supplied to the control circuit 16. In response to this input signal, the control circuit supplies energizing current to the solenoid 15.

When energized, the solenoid 15 causes the gate 14 to be pivotally advanced to the position shown in dotted outline. As a result, when the carrier 12 approaches the junction of the main tube 11 with the branch tube 13, the pivoted gate shunts the carrier into the branch tube. After a predetermined time interval elapses the gate is returned to the normal position, as hereinafter fully described.

The operation of the control circuit 16 in conjunction with the alternate type of pneumatic tube system illustrated in FIGURE 2 is generally similar to that described above. However, the pneumatic tube system illustrated in FIGURE 2 includes a different type of device for signalling the desired shunting of the carrier 12 into the secondary tube 13.

In this connection, the carriers 12, when employed in this second type of system, are provided with a plurality (i.e., two, in the illustrated embodiment) of suitably spaced dual magnet structures 21 such as are disclosed and claimed in the aforementioned co-pending application. The dual magnet structures 21 provided on those carriers to be shunted to the branch tube 13 are spaced apart so as to complement the spacing of a plurality of sensing coils 22. As shown, the sensing coils 22 are mounted on the main carrier tube 11 at a location suitably spaced from the junction of this tube with the branch tube 13. When employing this type of signalling device, the input signal to the control circuit 16 that leads to the energization of the solenoid 15 stems from the coincident inducement of signals in the sensing coils by the suitably spaced dual magnet structures.

Whether employing the type of signalling device illustrated in FIGURE 1 or that illustrated in FIGURE 2, the positive actuation of the gate 14 is effected in response to the producion of an output signal by the control circuit 16 as generally outlined above. The control circuit 16 preferably includes an input circuit 30 that supplies a signal in response to the suitable actuation of the signalling device 17 associated with the input circuit. The necessary operating power is supplied to the control circuit 16 from a suitable source of potential 31. The source 31 supplies a filtered output voltage to a regulator circuit 32 that in turn provides a biasing signal to a suitable switching network 33.

Signals supplied by the input circuit 30 are fed to and effect a change in the normal conductive state of the switching network 33. In response to this change in the conductive state of the switching network, an output signal is supplied by this network to an amplifier 34, which also has operating power supplied thereto from the source 31. The output signal supplied by this network is thereby amplified and fed to the solenoid 15. As a result, the solenoid 15 is energized and effects the pivoting of the gate 14 to direct the carrier 12 to the secondary conduit 13.

To facilitate a clear understanding of the detailed operation of the control circuit 16, this circuit will be initially described when employed in conjunction with the signalling device illustrated in FIGURE 1. The input circuit 30 utilized with this embodiment of the signalling device 16 including the dual sensing elements or brushes 19 is shown particularly in FIGURE 4.

As illustrated, a first of the brushes 19 is connected to a suitable source of negative potential (not shown) by a conductor 35, and the other of these normally noncontacting brushes 19 is connected through a resistor 36 and a capacitor 37 to ground. Accordingly, when the metallic bands 18 on a carrier 12 that is to be shunted to the branch tube 13 short-circuit the brushes 19, a charging circuit for the capacitor 37 is completed through the conductor 35, the brushes 19, and resistor 36.

As the capacitor 37 is charged, the potential developed thereacross approaches the breakdown potential of a Zener diode 38 that is connected to and between the junction of the resistor 36 and capacitor 37 and an input terminal 41 (FIG. 6) of the switching network 33. When the diode becomes biased into a conductive state by the voltage developed across the capacitor 37, a discharge path for the capacitor is thereby provided through the input terminal 41 of the switching network.

However, to insure that noise voltages and the like do not result in the premature and undesired breakdown of the diode 38, the resistor 36 is selected to insure that the capacitor 37 does not charge to the breakdown voltage of the diode 38 in a time interval less than that minimum interval corresponding to the short-circuiting of the brushes 19 by suitably spaced metallic bands 18 on a carrier that is to be shunted from the tube 11.

Figures 4, 5, 6:
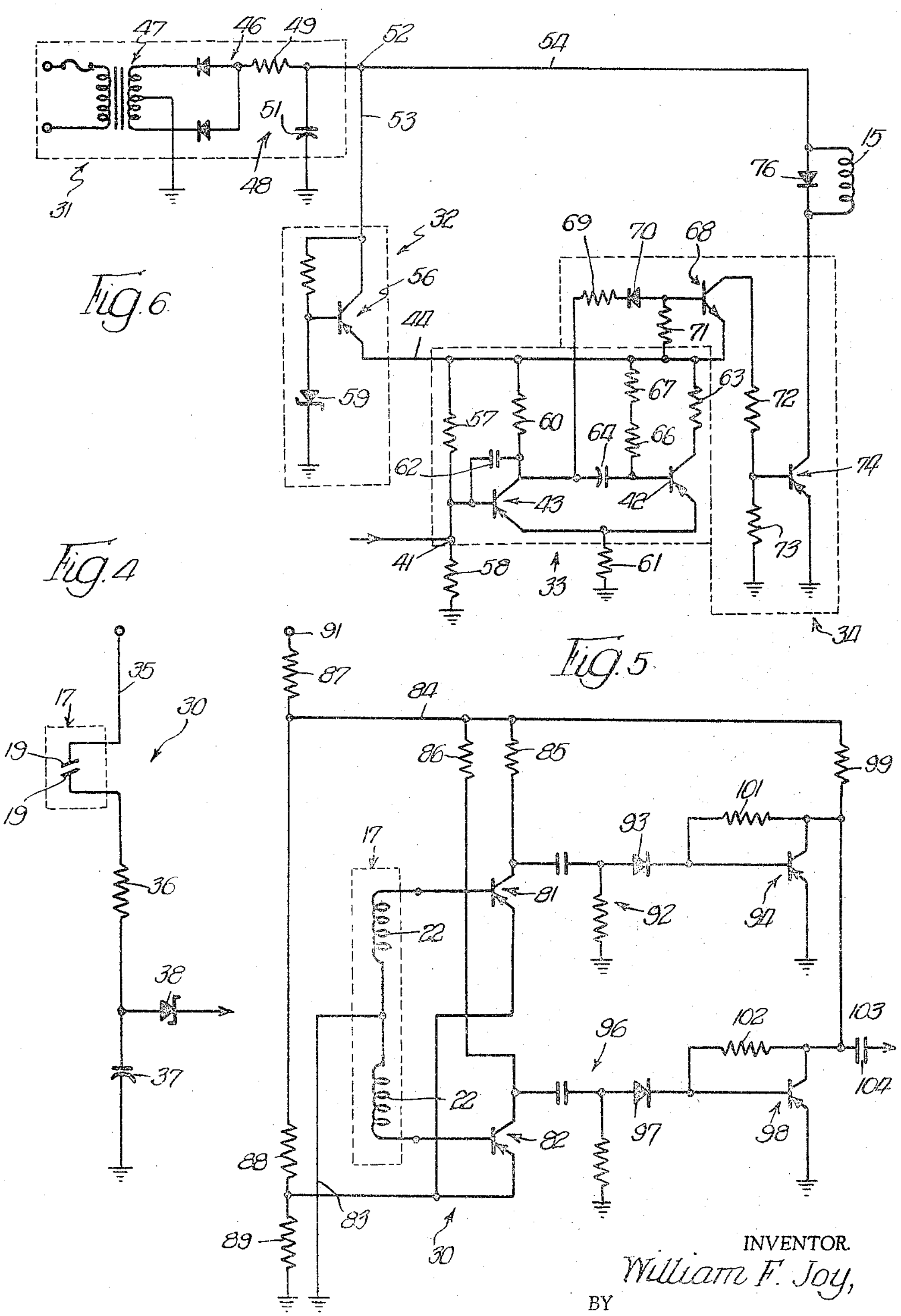
FIGURE 4 is a schematic representation of a preferred embodiment of an input circuit employed in the control circuit of the present invention when utilized with the type of pneumatic tube system illustrated in FIGURE 1.
FIGURE 5 is a schematic illustration of a preferred embodiment of another input circuit employed in the control circuit of the present invention when the latter is utilized with the type of pneumatic tube system illustrated in FIGURE 2.
FIGURE 6 is a schematic representation of a preferred embodiment of the remaining circuits that comprise the control circuit of the present invention.

As shown in FIGURE 6, the switching network 33, is a monostable multivibrator circuit, the conductive state of which is changed in response to discharge current being supplied thereto through the Zener diode 38. Preferably, the multivibrator circuit 33 includes a pair of PNP transistors 42 and 43 and is biased by the output from the regulator 32 so that the transistor 42 is in a normally conductive state.

More particularly, the regulator 32, which is a conventional transistorized series voltage regulator, is connected across the output of the voltage source 31 and regulates the output voltage from this source so that a substantially constant negative potential is applied to a conductor 44 in the multivibrator circuit 33. In this connection, the voltage source 31 includes a full wave rectifier 46 that is connected across the secondary winding of an input transformer 47. In a conventional manner, the rectifier 46 converts an A.C. input voltage developed across the secondary of the transformer 47 to a direct current potential. This D.C. output voltage from the full wave rectifier 46 is fed through a conventional filter network 48 included in the source 31 and formed by a resistor 49 and a capacitor 51. The filtered D.C. output voltage from the network 48 is in turn fed through a conductor 52 to a pair of parallelly connected conductors 53 and 54.

As shown, the conductor 53 is connected to the conductor 44 in the multivibrator circuit 33 through the collector-emitter junction of a PNP control transistor 56 included in the series voltage regulator 32. With this circuit arrangement, a path for current flow is provided from the conductor 52 at the output of the filter network through the transistor 56 and to ground through a pair of resistors 57 and 58 that are connected between ground and the conductor 44 at the input to the multivibrator circuit. In a conventional manner, the conductive state of the transistor 56 is controlled so that a substantially constant negative biasing potential is supplied to the conductor 44. A Zener diode reference element 59 is connected in the base circuit of the control transistor 56 and is utilized to stabilize the operation of this control transistor notwithstanding variations in the input current supplied thereto or variations in the load.

In the multivibrator circuit 33 whereto a substantially constant potential is supplied by the conductor 44, the input terminal 41, which is connected to the input circuit 30, is located at the junction between the biasing resistors 57 and 58 and the base of the normally non-conductive transistor 43. As shown, the collector of the transistor 43 is connected through a load resistor 60 to the conductor 44, and the emitter of this transistor is connected to ground through a resistor 61. A feedback capacitor 62 is connected between the base and the collector of the transistor 43.

The normally conductive transistor 42 is connected in the multivibrator circuit 33 in a manner similar to the transistor 43. In this connection, the transistor 42 is arranged in the multivibrator circuit so that it is rendered non-conductive when an input signal supplied to the circuit 33 biases the transistor 43 into conduction.

More particularly, the emitter of the transistor 42 is also connected to ground through the resistor 61. The collector of the transistor 42 is connected to the conductor 44 through a load resistor 63, and the base of this transistor is connected through a coupling capacitor 64 to the collector of the transistor 43. In a preferred embodiment of the invention, the relative values of the biasing resistors employed in the base circuits of the transistors 42 and 43 is such that, when the multivibrator circuit 33 is in a normal or quiescent state, the base-emitter junction of the transistor 42 is forward biased and this transistor is in a conductive state whereas the transistor 43 is maintained in a non-conductive state by the reverse biasing potential established across the base-emitter junction thereof. As a result, the voltage established at the collector of the transistor 43 during this period corresponds substantially to the negative potential on the conductor 44 (i.e., a small portion of this voltage is dropped across the resistor 60).

As shown, a serially connected resistor 66 and potentiometer 67 are connected between the conductor 44 and the base of the transistor 43. These latter two resistive components in conjunction with the capacitor 64 form a coupling network that controls the period of conduction of the transistor 43 and the cutoff time of the transistor 42 subsequent to an input signal being supplied to the multivibrator and causing a change in the normal conductive state thereof. As generally outlined above, a change in the conductive state of the multivibrator circuit 33 results in an output signal being supplied to the amplifier 34 and the solenoid 15 being energized.

In this connection, the input of the amplifier 34 is connected to the collector of the transistor 43, and the potential developed at this point in the multivibrator circuit serves as the biasing voltage for the base of an NPN transistor amplifier 68 that is employed in the amplifier circuit 34.

More particularly, a coupling network including a serially connected resistor 69 and a blocking diode 70 is connected between the collector of the normally non-conductive transistor 43 and the base of the transistor amplifier 68. The base of the transistor 68 is also connected to the conductor 44 through a resistor 71 that serves to temperature compensate the biasing conditions for the amplifier circuit 34. As shown, the emitter of the transistor amplifier 68 is connected directly to the conductor 44, and the collector of this transistor is connected to ground through a serially connected coupling resistor 72 and a temperature compensating resistor 73. It should be apparent that when the transistor 43 is in a non-conductive state, the transistor 68 is also biased in a non-conductive state since essentially the same negative potential exists at the base and the emitter thereof. Accordingly, substantially no current flows through the serially connected resistors 72 and 73, and a PNP transistor 74, which is connected in the output of the amplifier 34, is also maintained in a non-conductive state.

As illustrated in FIGURE 6, the base of the transistor 74 is connected directly to the junction between the coupling resistor 72 and the temperature compensating resistor 73, and the emitter of this transistor is connected to ground. As a result of this circuit arrangement, the base-emitter junction of the transistor 74 is reverse biased with no collector current flowing through the transistor amplifier 68. However, when the transistor 68 is rendered conductive, collector current flowing therethrough causes the transistor 74 to be biased into conduction. The solenoid 15, which is connected in series with the collector of the transistor 74 and the conductor 52, thereby becomes energized.

Pursuant to the foregoing general description, the energization of the solenoid 15 as a result of the transistor 74 being biased into a conductive state occurs substantially instantaneously after a suitably constructed carrier is advanced relative to the brushes 19. More particularly, when appropriate spaced rings 18 on a carrier 12 transiently communicate with and short circuit the brushes 19, the charging of the capacitor 37 is effected. As a result of the buildup of potential across the capacitor, the diode 38 is rendered conductive.

Upon being rendered conductive, the diode provides a discharge path for the capacitor 37 to ground through the input terminal 41 and the resistor 58. Discharge current flowing through the resistor 58 results in the base of the transistor 43 becoming relatively more negative. The base-emitter junction of the transistor 43 is thereby forward biased, and this transistor is rendered conductive so that collector current flows through and developes a voltage across the load resistor 60. Due to this voltage drop across the load resistor 60, the collector of the transistor 43 becomes relatively more positive and this potential increase is coupled to the base of the transistor 42 to render this transistor non-conductive. Since the emitters of the transistors 42 and 43 are connected to ground through the common resistor 61, increased emitter current in the transistor 43 tends to be compensated for by a decrease in the emitter current in transistor 42. This compensating action due to the use of the single resistor 61 further results in the prompt cutoff of the transistor 42 after the transistor 43 is rendered conductive. As with any monostable multivibrator, the transistor 42 remains cutoff until the coupling capacitor 64 is discharged through the resistor 66 and potentiometer 67.

When the transistor 43 is rendered conductive, the reduction in the magnitude of the negative voltage established at the collector thereof is also coupled to the base of the NPN transistor amplifier 68. The transistor 68 is thereby forward biased and rendered conductive. The resulting flow of collector current through the resistors 72 and 73, which act as a voltage divider network, causes the base of the transistor 74 to become relatively more negative than it was when the transistor 68 was in a non-conductive state. Consequently, the transistor 74 becomes forward biased and is rendered conductive.

Collector current flowing through the transistor 74 and more particularly through the winding of the solenoid 15, which is connected in series with the collector of this transistor, effects the energization of the solenoid. When this occurs, the gate 14, which is actuated in response to the energization of the solenoid 15, is swung into the path of the carrier 12, and the carrier is thereby shunted into the branch tube 13. The suitable selection of the components employed in the multivibrator circuit 33 assures that a sufficient time interval elapses to allow the carrier 12 to be shunted into the branch tube 13 prior to the time that the multivibrator circuit returns to its normal conductive state. However, after the appropriate time interval has elapsed and the transistor 42 is again rendered conductive, the transistors 68 and 74 in the amplifier circuit 34 are rendered non-conductive and the solenoid becomes de-energized. As shown in FIGURE 6, a semiconductor diode 76 is connected in parallel with and shunts the winding of the solenoid 15. This diode is utilized in the control circuit to minimize and suppress the inductive effects incident to the cutoff of energizing current to the winding of the solenoid.

The operation of the control circuit 16 is substantially the same as described above when employed in conjunction with the signalling device illustrated in FIGURE 2. However, the input circuit 30 utilized with this embodiment of the signalling device differs from that just described.

Referring to FIGURE 5, the alternate embodiment of the input circuit 30 is essentially a parallelly connected AND gate. The sensing coils 22 are connected in the input circuit 30 so that signals induced therein result in a negative potential being supplied to the base of each of a pair of parallelly connected normally non-conductive PNP transistors 81 and 82. In this connection, one side of each of the sensing coils 22 is connected to ground through a conductor 83, and the other side of the coils is connected to the base of the transistors 81 and 82, respectively.

The collector of the transistor 81 is connected to a conductor 84 through a load resistor 85 and that of the transistor 82 is connected to this same conductor through a load resistor 86. As shown, the conductor 84 is connected to a voltage divider network including a pair of biasing resistors 87 and 88 and a temperature compensating resistor 89. The resistors 87–89 are connected in series between an input terminal 91 whereto a negative potential is supplied (e.g., from the voltage regulator 32) and ground. The emitter of each of the transistors 81 and 82 is connected to ground through the temperature compensating biasing resistor 89.

With the circuit arrangement outlined above and with no signal induced in the sensing coils 22, the base-emitter junction of each of the transistors 81 and 82 is reversed biased, and these transistors are maintained in a non-conductive state. As a result, substantially no current flows through the load resistors 85 and 86 and the collector of each of these transistors is maintained at a negative potential corresponding substantially to the potential supplied to the conductor 84 by the voltage divider network.

The negative potential that is normally maintained on the collector of the transistor 81 is coupled through a conventional R-C filter network 92 and a blocking diode 93 to the base of the PNP transistor 94. Similarly, the negative potential established at the collector of the transistor 82 is coupled through a R-C filter network 96 and a blocking diode 97 to the base of a PNP transistor 98. As shown, the transistor 98 is connected in the input circuit 30 in parallel with the transistor 94.

The collector of each of the transistors 94 and 98 is connected to the conductor 84 through a load resistor 99. Feedback resistors 101 and 102 are connected between the collector and base of each of the transistors 94 and 98, respectively, and the emitter of each of these transistors is connected directly to ground.

Since a negative potential is coupled to the base of each of the transistors 94 and 98 when the transistors 81 and 82 are in a non-conductive state, the base-emitter junction of each of these transistors is forward biased and collector current flows through the resistor 99. Collector current flowing through the resistor 99 results in a voltage being developed thereacross. The voltage developed across the resistor 99 results in an output junction 103 of the input circuit 30 being normally maintained at substantially ground potential, and this potential is supplied through a coupling capacitor 104 to the input terminal 41 of the multivibrator circuit 33 (FIG. 6).

When no signals are induced in the sensing coils 22, the circuit conditions described above are maintained in the input circuit 30. Accordingly, the potential supplied to the input terminal 41 is not sufficiently negative to render the transistor 43 conductive. However, when signals are simultaneously induced in the sensing coils 22, the base-emitter junction of each of the transistors 81 and 82 becomes forward biased and these transistors are rendered conductive. The resulting flow of collector current through the load resistors 85 and 86 results in a voltage being developed across these resistors, and the potential developed at the collectors of the transistors 81 and 82 becomes relatively more positive.

The change in the voltage established at the collectors of the transistors 81 and 82 is coupled to the base of each of the transistors 94 and 98. Since the bases of these transistors are thereby rendered relatively more positive, the necessary forward bias no longer exists and the transistors 94 and 98 are simultaneously rendered non-conductive. The resulting cutoff of collector current flow through the resistor 99 results in an increase in the negative potential established at the output junction 103, and this voltage approaches the potential established on the conductor 84 by the voltage divider network. This decrease in potential is coupled through the capacitor 104 and is supplied to the input terminal 41. As described in conjunction with FIGS. 4 and 6, this increased negative potential causes the normal conductive state of the multivibrator 33 to be changed and ultimately results in the energization of the solenoid 15 in the manner outlined above. If only one of transistors 94 or 98 is rendered non-conductive, the resulting decrease in potential occurring at the junction 103 is too small to render the transistor 43 conductive.

Figure 7:
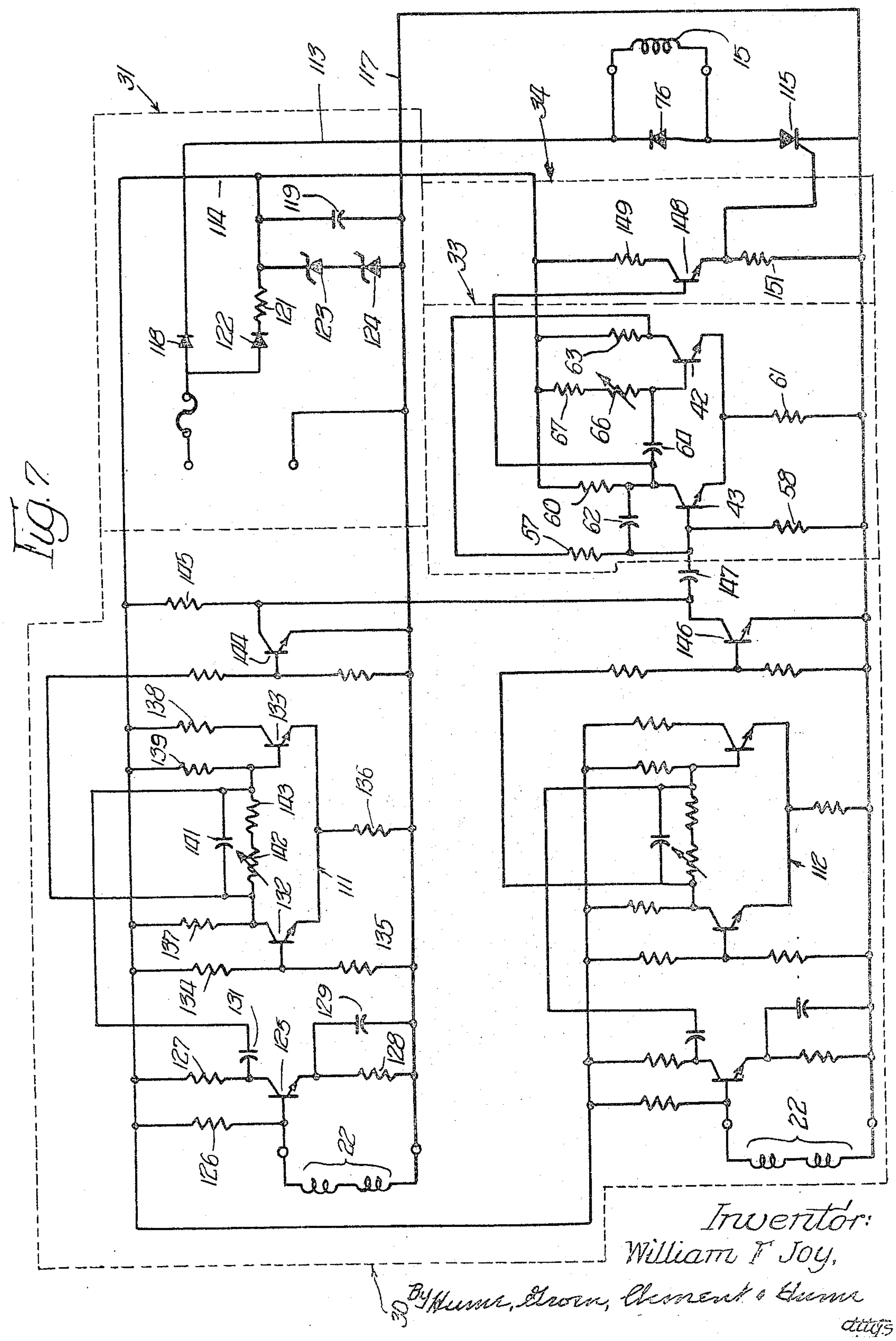
FIGURE 7 is a schematic representation of another preferred embodiment of the control circuit of the present invention.

Referring now to FIGURE 7, there is shown another preferred embodiment of the control circuit of the present invention. The principal differences between the control circuit previously described and the control circuit of FIGURE 7 are as follows:

(1) In the input circuit 30 the differentiating R-C networks 92 and 96 in FIGURE 5 are replaced in FIG- URE 7 by monostable multivibrators 111 and 112 to provide respective square wave outputs;

(2) In FIGURE 7, the power supply 31 provides half wave rectified voltage on lead 113 and full wave rectified voltage on lead 114;

(3) In FIGURE 7, a silicon controlled rectifier 115 is used to drive the solenoid coil 15; and (4) NPN transistors are used in FIGURE 7 in place of corresponding PNP transistors in FIGURES 5 and 6, and a PNP transistor 116 is used in the output amplifier 34 in FIGURE 7.

Since the structure and operation of the control circuit of FIGURE 7 is similar to the control circuit shown in FIGURES 5 and 6, the control circuit of FIGURE 7 will be described only in such depth as to make the differences noted above and other differences in FIGURE 7 understood by persons skilled in the art.

Referring first to the power supply 31 in FIGURE 7, it should be noted that a positive half wave rectified voltage is applied across the power lead 113 and the common lead 117 by a diode 118. The power lead 113 is connected to one side of the solenoid coil 15 and to the cathode of the solenoid cutoff diode 76. The opposite side of the solenoid coil 15 is connected to the anode of the silicon controlled rectifier 115. The cathode of the silicon controlled rectifier 115 is connected to the common lead 117. With this circuit arrangement, the silicon controlled rectifier 115 is fired by the presence on its gate of positive voltage output from the amplifier 34, as will be more particularly described further on. Since half wave rectified voltage is being applied across the anode and cathode of the silicon controlled rectifier 15, the silicon controlled rectifier 15 is quenched every A.C. cycle.

Full wave rectified positive voltage is supplied to the input circuit 30, the switching circuit 33, and the amplifier 34 in FIGURE 7 via the supply voltage lead 114 which is connected to the output of the R-C filter network formed by capacitor 119 and the resistor 121 connected to the diode 122. A pair of Zener diodes 123 and 124 serially connected across the filter capacitor 119 provide voltage regulation.

Turning now to the input circuit 30 in FIGURE 7, the circuitry associated with only one of the pickup coil units 22 will be referred to since the respective circuitry associated with each of the coil units 22 is identical.

Input signals induced in the pickup coil unit 22 are applied across the base-emitter junction of the NPN transistor 125. The transistor 125 is connected in common emitter circuit configuration, and its base-emitter junction is normally reverse-biased by resistors 126, 127, and 128, and the coil unit 22. A capacitor 129 is connected between the emitter of the transistor 125 and the common lead 117 to provide A.C. by-pass of the bias resistor 128. When the base-emitter junction of the transistor 125 is forward-biased by a positive voltage impulse induced in the coil unit 22, a negative output pulse provided by the flow of collector current in the transistor 125 is conducted to the monostable multivibrator 111 via a coupling capacitor 131.

The monostable multivibrator 111 comprises a pair of NPN transistors 132 and 133. The base of the transistor 132 is connected to the junction of biasing resistors 134 and 135. The emitters of both transistors 132 and 133 are connected to the common lead 117 by a resistor 136. The collector of the transistor 132 is connected through a resistor 137 to the positive voltage supply lead 114. Similarly, the collector of the transistor 133 is connected to the positive potential supply lead 114 through a resistor 138 while the base of the transistor 133 is connected to the lead 114 by a resistor 139.

The resistor values in the multivibrator 111 are selected so that the base-emitter junction of the transistor 133 is normally forward-biased rendering the transistor 133 normally conductive, and the base-emitter junction of the transistor 132 is normally reverse-biased rendering the transistor 132 normally non-conductive. However, when a negative input pulse is applied to the base of the normally conductive transistor 133 via the coupling capacitor 131, the transistor 133 is rendered non-conductive, and the transistor 132 is rendered conductive for a time determined by the R-C coupling network consisting of the capacitor 141, the potentiometer 142, and resistors 143 and 139.

During the time the transistor 132 is conductive, a negative square wave pulse is provided at the collector of the transistor 132 and applied to the base of the normal conductive transistor 144 rendering this transistor non-conductive and lessening the voltage drop across the resistor 145. When transistor 144 and its counterpart transistor 146 are both rendered non-conductive due to the appearance at substantially the same time of positive voltage pulses in both coils 22, a positive square wave pulse of sufficient magnitude is submitted to the switching circuit 33 via a coupling capacitor 147 to actuate the switching circuit 33. In this manner, the transistors 144 and 146 cooperate as an AND gate since simultaneous cutoff of both of these transistors is necessary to actuate the switching circuit 33. It should be noted that by utilizing monostable multivibrators 111 and 112 in lieu of differentiating circuits as in FIGURE 5, a time displacement tolerance between pulses induced in the coils 22 can be accommodated, and this tolerance can be adjusted by adjusting the time length of the square wave pulses provided by the multivibrators 111 and 112, respectively.

The switching circuit 33 in FIGURE 7 is the same as that shown in FIGURE 5 except for the use of NPN transistors. Accordingly, a positive input to the switching circuit 33 results in a negative square wave pulse applied to the base of a normally non-conductive PNP transistor 148 of the amplifier 34. The emitter of the transistor 148 is connected to the positive voltage lead 114 by a biasing resistor 149, and the collector of the transistor 148 is connected to the common lead 117 by a resistor 151. The normally reverse-biased base-emitter junction of the transistor 148 is forward-biased by the negative square wave pulse from the switching circuit 33 and the transistor 148 is rendered conductive. Collector current flow provides a square wave turn-on pulse to the gate of the silicon controlled rectifier 115. In this manner, the solenoid coil 15 is effectively energized for a time determined by the "on" time of the switching circuit 33. The A.C. 60-cycle period is small in comparison to the "on" time of the switching circuit 33 and in comparison to the drop out time of the solenoid. Hence, solenoid remains actuated so long as the positive voltage remains on the gate of the silicon controlled rectifier 115, although the silicon controlled rectifier is quenched every A.C. cycle.

In some installations, it may be desirable to use the control circuit of FIGURE 7 to actuate a relay instead of a solenoid. A relay coil, for example, may be substituted in place of the resistor 151 and the solenoid driving circuitry including the silicon controlled rectifier 115 and the half wave rectifier diode 118 may be eliminated. Alternatively, the relay coil if sufficiently sensitive may be substituted in place of the resistor 60 in the switching circuit 33, thereby also obviating the need for the amplifier 34.

Figures 8, 10:
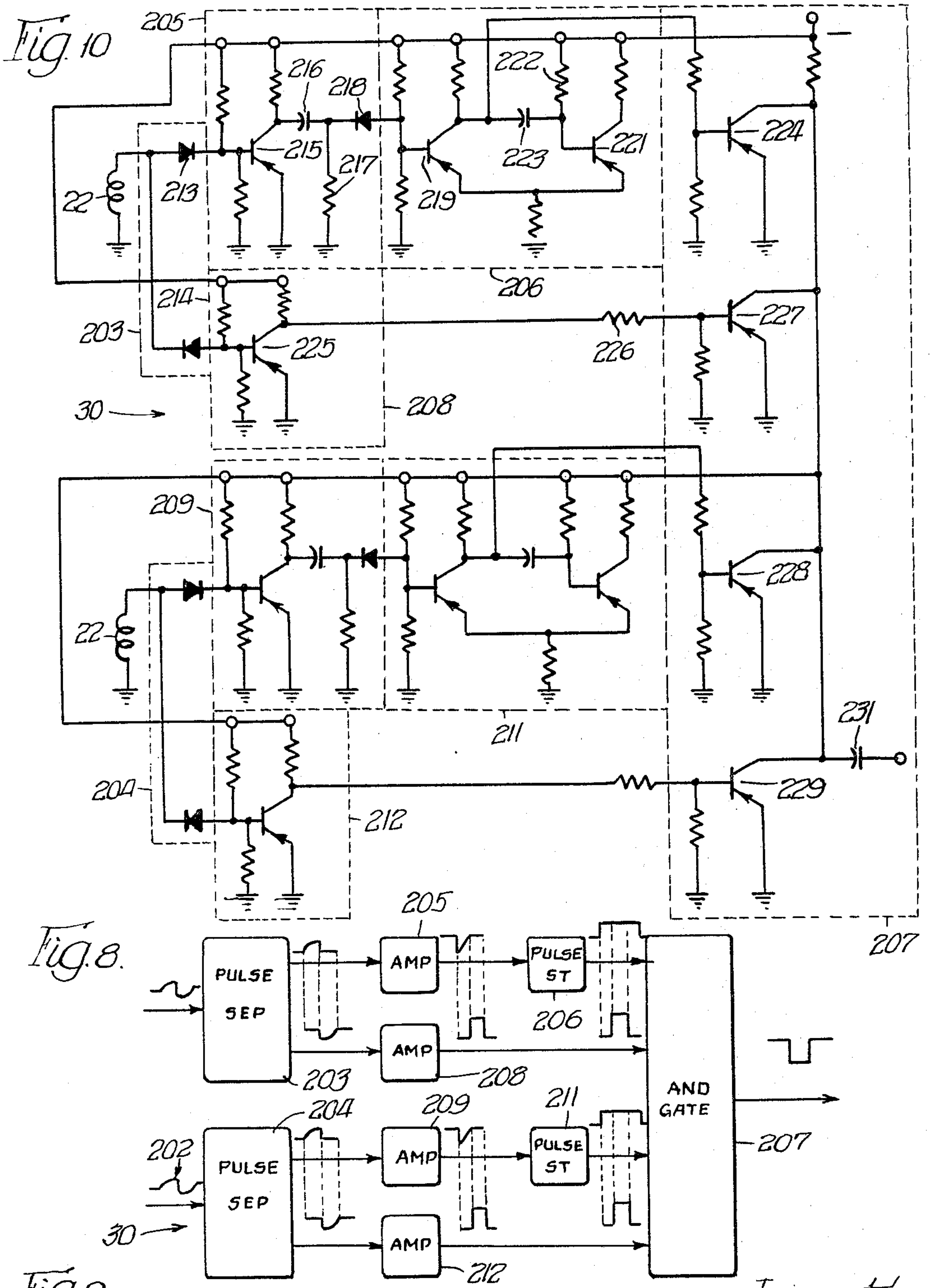
FIGURE 8 is a block diagram of another preferred form of the input circuit of the present invention.
FIGURE 10 is a schematic diagram of the input circuit shown in block form in FIGURE 8.
Figure 9:
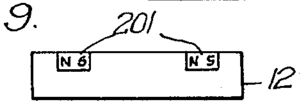
FIGURE 9 is a diagrammatic illustration of a carrier having signalling devices in the form of bar magnets polarized parallel to the axis and direction of travel of the carrier.

Referring now to FIGURE 8, a block diagram is provided of another form of input circuit 30 which is adapted to be used in conjunction with a carrier 12 which is provided with single bar magnet signalling structures 201, polarized axially of the carrier 121 as shown diagrammatically in FIGURE 9, in place of the dual magnet signalling structure 21 shown in FIGURE 2. The single magnet structure 201 in an ordinary coil induces a bi-potential signal 202 instead of the substantially single potential peak polarized signal of the type provided by the dual magnet structure 21 of FIGURE 2 and described in the co-pending application Serial No. 243,276, filed Dec. 10, 1962. For a magnet 201 moving past a conventional coil 22 of the type shown in FIGURE 7, the first half portion of the voltage signal 202 will be positive or negative depending upon the polar orientation of the magnet. Hence, one pair of axially-spaced magnets 201 of one polar orientation may be used on a carrier 12 to provide one address, for example, loop address, while another pair of axially-spaced magnets 201 of opposite polar orientation may be used on the same carrier 12 to provide a second address, for example, station address, provided the control circuitry employed is capable of polarity discrimination. It will be apparent to those skilled in the art that additional addresses and other coding combinations would also be possible.

The input circuit 30 shown in block form in FIGURE 8 and schematically in FIGURE 10 is polarity sensitive to provide the advantageous capability in the control circuit for responding to the coincidence of two pulses generated by axially-polarized magnets 201 of the same orientation and rejecting all other pulses including coincident pulses induced by magnets 201 of opposite polar orientation.

Briefly described, the input circuit 30 of FIGURE 8 is provided with a pulse separator 203 associated with the input from one standard pickup coil and a second pulse separator 204 associated with the input from another standard pickup coil. The positive portion of a bi-potential signal 202 applied to the pulse separator 203 is directed to an amplifier 205 and thence through a pulse stretcher 206 to the common AND gate 207 while the negative half portion of this signal is directed to an amplifier 208 and thence directly to the AND gate 207. Similarly, the positive portion of a bi-potential signal 202 applied to the separator 204 is directed to an amplifier 209 and thence through a pulse stretcher 211 to the AND gate 207 while the negative half portion of this signal is directed to an amplifier 212 and thence directly to the AND gate 207. If the two signals 202 are coincident and both have their positive half portions occurring prior in time to their negative half portions, an output signal will be obtained from the AND gate as shown in FIGURE 8. However, if the respective pulses 202 are not sufficiently coincident in time or do not both appear positive portion first, no output signal will be obtained from the AND gate 207.

Turning now to FIGURE 10, the schematic diagram of the polarity and coincidence sensing input circuit 30 of FIGURE 8 will be described briefly and principally by reference to the operation of the circuitry since various portions of the overall circuit are similar in structure to portions of circuits previously described. Also, since the circuitry associated with one of the pickup coils 22 is identical to its counterpart associated with the other coil 22, the circuitry associated with only one of the coils 22 will be principally referred to.

It is seen that the pulse separator 203 comprises a pair of diodes 213 and 214. Diode 213 is oriented to pass only the positive portion of the signal induced in the coil 22 to the base or PNP transistor 215 in the amplifier 205. The transistor 215 is connected in a conventional common emitter circuit configuration, and its base-emitter junction is normally forward-biased so that the transistor 215 is normally conductive. The positive input pulse to the base of the transistor 215 reverse-biases the base-emitter junction and effectively stops the flow of collector current. The resulting negative pulse at the collector of the transistor 215 is differentiated by capacitor 216 and resistor 217. The negative portion of resulting differentiated signal is passed by a blocking diode 218 and applied to the base of the PNP transistor 219 which together with the PNP transistor 221 and the familiar monostable multivibrator circuitry form the pulse stretcher 206. The normally non-conductive transistor 219 is rendered conductive by the negative input for a time determined by the resistor 222 and the capacitor 223. While the transistor 219 is "on," a positive square wave pulse appearing at the collector of the transistor 219 is applied to the base of the PNP transistor 224 in the AND gate 207. The base-emitter junction of the transistor 224 is thereby reverse-biased, and collector current flow is effectively terminated.

Meanwhile the negative portion of the initial pulse from the coil 22 is applied via the diode 214 to the base of a transistor 225 in the amplifier 208. The base-emitter junction of the transistor 225 is normally reverse-biased. The negative input from the diode 214 forward-biases this junction to render the transistor 225 conductive. When the transistor 225 is turned "on," the resulting flow of collector current results in a positive pulse being applied via the resistor 226 to the base of the normally conductive PNP transistor 227 in the AND gate 207. The transistor 207 is thereby turned "off." When the AND transistors 224, 227, 228, and 229 are all simultaneously turned "off," the resulting negative voltage output through the capacitor 231 is of sufficient magnitude to actuate the solenoid as previously described.

Figures 17, 18:
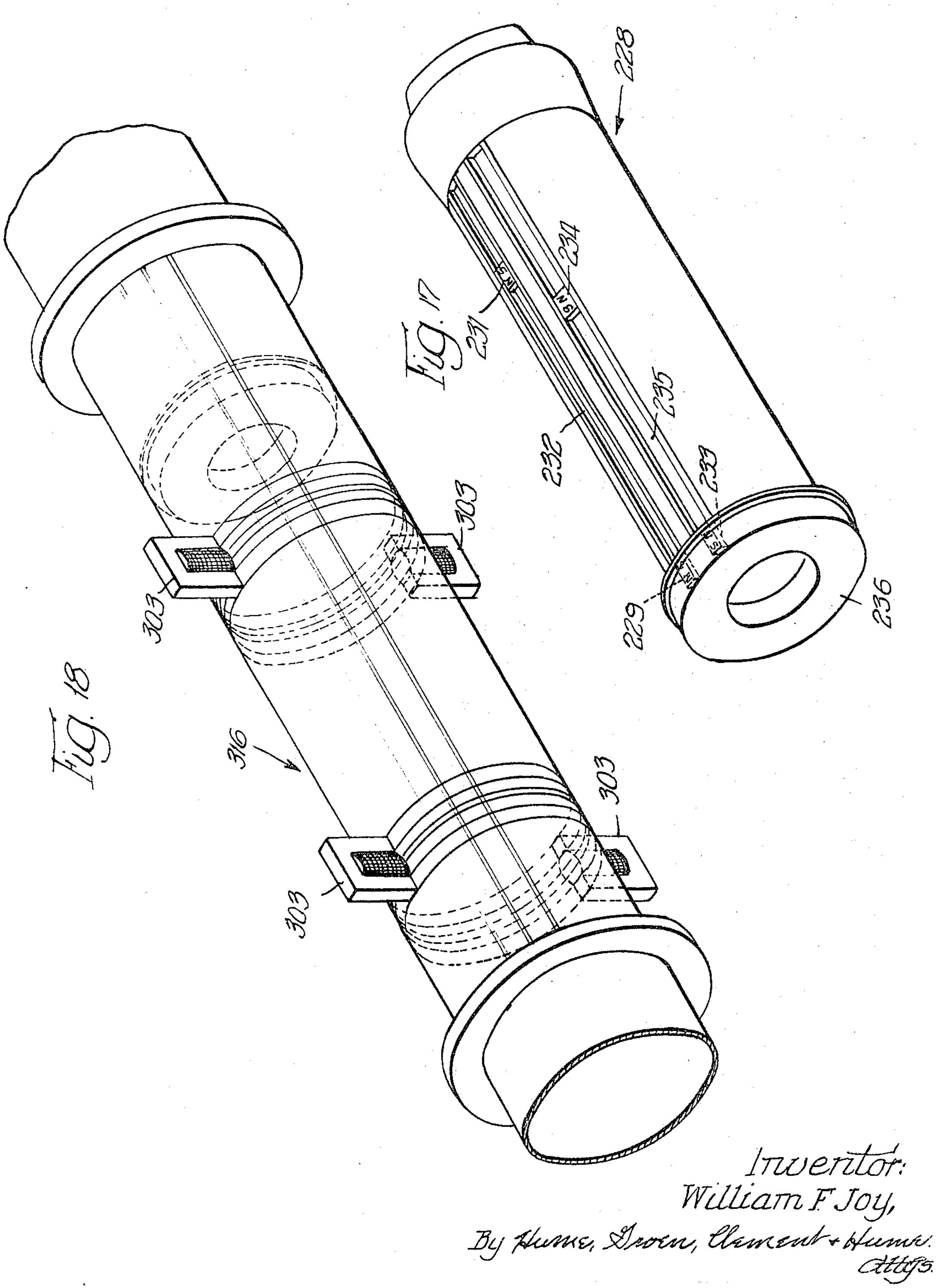
FIGURE 17 is an isometric view of a circular pneumatic tube provided with E-frame coils and cooperating ferromagnetic bands for use in practicing the present invention.
FIGURE 18 is an isometric view of a circular carrier adapted to travel in the pneumatic tube of FIGURE 17.

Referring briefly to FIGURE 17, the cylindrical carrier 228 shown is a type of carrier for which the polarity discriminating input circuit 30 of FIGURES 8 and 10 is particularly useful. The carrier 228 is provided with one pair of axially polarized bar magnets 229 and 231 associated with an axial track 232 and a second pair of axially polarized bar magnets 233 and 234 associated with a second axial track 235 circumferentially spaced from the track 232. The magnets 229 and 233 are stationary while the magnets 231 and 234 are slidably positionable in their respective tracks 232 and 235. The magnets preferably have a high energy product at low flux density, and the tracks should preferably be spaced at least an inch apart to prevent magnetic interaction. By way of example, the axial spacing of the magnets 229 and 231 may be used to provide a loop destination address while the axial spacing of the magnets 233 and 234 may be used to provide a station destination address within the selected loop. Both magnets 229 and 231, for example, would be oriented with their north poles toward the forward end 236 of the carrier 228 while both magnets 233 and 234 would be oriented with their south poles toward the forward end 236 of the carrier 228. Carrying this example forward, a pair of conventional coils 22 of the type shown in FIGURE 2 positioned appropriately on the pneumatic tube would feed a polarity discriminating input circuit of the type shown in FIGURES 8 and 10 adapted to read only the loop address north-pole-forward magnets 229 and 231 and to produce an output signal to initiate actuation of a loop selecting solenoid when the spacing between the magnets 229 and 231 is the same as that between the coils 22. Similarly, another pair of coils 22 would feed a polarity discriminating input circuit 30 of the FIGURE 8, FIGURE 10 type adapted to read only the south-pole-forward magnets 233 and 234 to initiate actuation of a station selecting solenoid when coincident pulses are induced in this pair of coils 22 by the magnets 233 and 234. The particular polarity adaptation of the input circuit 30 of FIGURE 10 is changed by reversing the diodes 213 and 214, biasing the transistor 215 normally "off," and biasing the transistor 225 normally "on" and making the same changes in the counterparts of these elements in the circuitry associated with the other coil 22. In addition, the circuitry associated with one coil 22 in the FIGURE 10 input circuit 30 may be adapted to read only magnets of one polarity orientation while the circuitry associated with the other coil 22 may be read only magnets of opposite polar orientation. It should be apparent that the number of tracks on the carrier 228, the number of magnets involved, and the particular polarity and magnet spacing arrangements are all factors which may vary with the particular equipment and type of installation involved.

Figures 11, 12, 13, 14A, 14B, 15, 16:
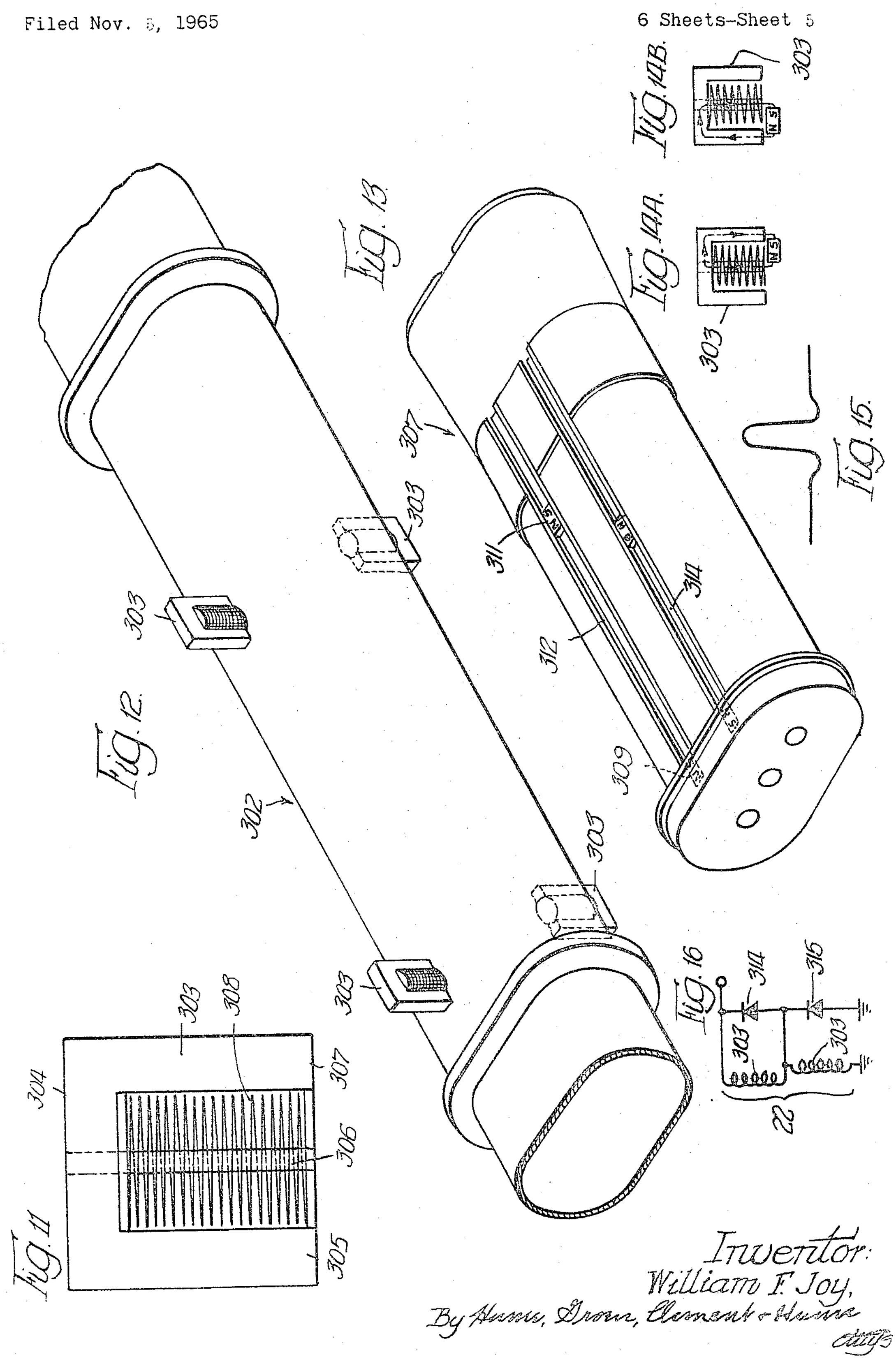
FIGURE 11 is an elevational view of an E-frame coil used in practicing the present invention.
FIGURE 12 is an isometric view of a non-circular pneumatic tube provided with E-frame coils for use in practicing the present invention.
FIGURE 13 is an isometric view of a non-circular pneumatic carrier adapted to travel in the pneumatic tube of FIGURE 12.
FIGURES 14A and 14B illustrate the flux flow through an E-frame coil of FIGURE 11 as a magnet axially polarized in the direction of travel passes the same.
FIGURE 15 is a diagrammatic illustration of the voltage signal induced in an E-frame coil by the passing magnet shown in FIGURES 14A and 14B.
FIGURE 16 is a schematic illustration of the circuit connection of a pair of E-frame coils to form a pickup coil unit.

Turning now to FIGURES 11 through 15, another arrangement is shown for providing a polarity discriminating control circuit. FIGURES 12 and 13 show this arrangement with reference to a non-circular carrier 301 and a non-circular pneumatic tube 302. In this form of the invention, the polarity discrimination is provided by unique E-frame pickup coil elements 303.

As seen in FIGURE 11, the E-frame pickup coil element 303 comprises a common bar 304 provided with three co-planar legs 305, 306, and 307 perpendicular thereto to form the E-shaped frame. The E-shaped frame is composed of ferro-magnetic material and may be fabricated by providing a conventional U-shaped coil frame with the middle leg 306. The middle leg 306 is provided with an encircling coil 308 which has as many turns as possible without adding excessive losses.

In FIGURE 12, four E-frame coil elements 303 are mounted on the pneumatic tube 302 to read the north-pole-forward magnets 309 and 311 associated with the track 312 on the carrier 301. The E-frame coil elements atop the pneumatic tube are mounted with their E-frame legs disposed downwardly and lying in a common plane in which the magnets 309 and 311 will pass if the carrier 301 is travelling upright in the pneumatic tube 302. The E-frame coil elements mounted on the bottom of the pneumatic tube 302 are disposed with their E-frame legs disposed in a common plane in which the magnets 309 and 311 will pass if the carrier 301 is travelling in inverted position in the pneumatic tube 302. Each pair of adjacent top and bottom E-frame coil elements 303 lies in a plane transverse to the pneumatic tube 302 and are serially connected as shown in FIGURE 16 to form a pickup coil unit 22.

The unique advantage of the E-frame coil elements 303 is that a bar magnet polarized in the direction of travel of the carrier will induce a signal of the type shown in FIGURE 15 having a single major peak which is positive or negative (not shown) depending upon the direction of winding of the coil 308 and whether the magnets appear north-pole-forward or south-pole-forward. The voltage peak shown in FIGURE 15 results from increasing flux linkages with the coil 308 and with the flux travelling in one direction through the middle leg 306 as the magnet approaches the middle leg 306 in FIGURE 14A, followed by decreasing flux linkages with the coil 306 and with the flux travelling in the opposite direction as the magnet travels away from the middle leg 306 as in FIGURE 14B. There is a relatively sharp reversal of flux direction through the middle leg 306 as the magnet passes the same.

Accordingly, by using a pair of the FIGURE 16 type coil units 22 (each including two E-frame coil elements 303) in the circuit of FIGURE 7 to provide positive peak signals upon the passage of north-pole-forward magnets, for example, only magnets so oriented will be read to produce an output upon coincidence since the negative voltage pulses of south-pole-forward magnets will evoke no response by the control circuit. In reference to FIGURE 13, this means that only the magnets 309 and 311 will be read by such an arrangement. The south-pole-forward magnets in track 314 would be read by another E-frame coil arrangement adapted to read only south-pole-forward magnets. Moreover, because of the spacing between the tracks 312 and 314 on the carrier 302, the magnets in the track 314 will not induce voltage signals in the E-frame coil elements 303 as placed on the pneumatic tube 302 in FIGURE 12. Hence, the magnets in track 314 may also be north-pole-forward magnets if desired. The bar magnets on the carrier 301 preferably have a high energy product at low flux density, and the lateral spacing of the tracks 312 and 314 is preferably at least one inch to prevent interaction.

Referring briefly again to FIGURE 16, the diodes 314 and 315 are preferably provided to clip the small negative side lobes of the FIGURE 15 signal.

Turning now to FIGURES 17 and 18, there is shown a unique arrangement for using the polarity discriminating E-frame shaping coils 303 with a circular carrier 228 and circular pneumatic tube 316. Since the circular carrier 228 does not maintain a predetermined orientation in the pneumatic tube 316, three ferromagnetic bands 317 encircling the pneumatic tube 316 are provided, each being connected to one of the legs of at least one E-frame coil element 303, as shown in FIGURE 18. In this manner the E-frame coil elements are adapted to provide their unique polarity discriminating function despite random radial orientation of the carrier 228 as it passes through the pneumatic tube 316. Preferably, two E-shaped coil units 303 are compatibly connected to each of the groups of three ferromagnetic bands 317 as shown in FIGURE 18 and also connected as in FIGURE 15 to enhance signal inducement. The control circuit of FIGURE 7 is preferably used with this pickup coil arrangement.

It will be appreciated that the foregoing is merely illustrative of the invention. Various modifications of the control circuit can be devised by one skilled in the art without departing from the invention, various features of which are set forth in the accompanying claims. For example, a brush type sensing arrangement similar to FIGURE 4 may be used to provide an input signal to the switching circuit 33 in FIGURE 7. Further, in FIGURE 7, additional sensing units and associated circuitry may be provided. Also, other forms of power supply may be provided in lieu of the power supply 31 shown in FIGURE 7.

What is claimed is:

1. In a pneumatic tube system, the combination comprising: a main pneumatic tube; a secondary pneumatic tube branching from said main pneumatic tube; a carrier adapted to travel in said main pneumatic tube and including address information signalling means thereon; a path-defining instrumentality for diverting said carrier from said main pneumatic tube to said secondary pneumatic tube when said path-defining instrumentality is actuated; sensing means mounted on said main pneumatic tube for sensing said address information signalling means on said carrier when said carrier is advanced through said main pneumatic tube; an input circuit connected to said sensing means for providing an output signal when predetermined address information is sensed by said sensing means; a pair of transistors connected so as to form a monostable multivibrator circuit that is connected to the output of said input circuit; means connected to said multivibrator circuit so that a first of said transistors is normally maintained in a conductive state, said multivibrator circuit being responsive to said output signal of said input circuit so that a second of said transistors is transiently rendered conductive, said first transistor is transiently rendered non-conductive, and an output signal is produced by said multivibrator circuit; an amplifier connected at its input to the output of said multivibrator circuit for producing an amplified output signal when said second transistor of said multivibrator circuit is transiently rendered conductive; and means connected in circuit with said amplifier for actuating said path-defining instrumentality in response to said output signal from said amplifier, said means connected in circuit with said amplifier comprising a solenoid coil connected in series with a silicon controlled rectifier across a source of half wave rectified voltage, the gate of said silicon controlled amplifier being connected directly to the output of said amplifier so as to cause said silicon controlled rectifier to fire when the output signal from said amplifier is applied to said gate.

2. The combination defined in claim 1 wherein said input circuit includes a first monostable multivibrator circuit connected with one of said sensing coils, a second monostable multivibrator circuit connected with the other of said sensing coils, and an AND gate connected to said first and second monostable multivibrators for providing said input circuit output signal upon the simultaneous inducement of voltage signals in said sensing coils which cause said first and second monostable multivibrators to transiently apply simultaneous voltage signals to said AND gate.

3. The combination defined in claim 2 wherein said information sensing means comprises a pair of sensing coils encircling said main pneumatic tube in predetermined spaced relationship with one another and wherein said address information signalling means comprises a first pair of magnets aligned co-axially with one another and polarized parallel to the axis of said carrier with one pole of one of said first pair of magnets in closely-spaced relationship with the like pole of the other of said first pair of magnets and a second pair of magnets aligned co-axially with one another and polarized parallel to the axis of said carrier with one pole of one of said second pair of magnets in closely-spaced relationship with the like pole of the other of said second pair of magnets, said first pair of magnets being stationarily mounted on said carrier, said second pair of magnets being movably mounted on said carrier for slidable position adjustment parallel to the axis of said carrier to provide said address information.

4. In a pneumatic tube system, the combination comprising: a pneumatic tube; a carrier adapted to travel in said pneumatic tube and including address information signalling means thereon, said address information signalling means comprising first and second magnets polarized parallel to the axis of said carrier and selectively spaced from one another in a direction parallel to the axis of said carrier; a pair of sensing coils encircling said main pneumatic tube in predetermined spaced relationship with one another, said carrier first and second magnets each inducing bi-potential voltage signals in said sensing coils when said carrier passes through said sensing coils; and an input circuit comprising an AND gate, a first pulse separator connected to one of said sensing coils for separating each bi-potential signal induced in said one sensing coil into a first portion of one potential and a second portion of opposite potential, a first monostable multivibrator for receiving said first portion of said signal induced in said one sensing coil and responding thereto to transiently conduct for an extended time to apply an output signal of extended time duration to said AND gate, means for receiving and applying said second portion of said signal induced in said one sensing coil to said AND gate, a second pulse separator connected to the other of said sensing coils for separating each bi-potential signal induced in said other sensing coil into a first portion of one potential and second portion of opposite potential, a second monostable multivibrator for receiving said first portion of said signal induced in said other sensing coil and responding thereto to transiently conduct for an extended time to apply an output signal of extended time duration to said AND gate, and means for receiving and applying said second portion of said signal induced in said other sensing coil to said AND gate, said AND gate providing an output signal when said signals applied thereto are coincident in time.

5. In a pneumatic tube system, the combination comprising: a pneumatic tube; a carrier adapted to travel in said pneumatic tube and including address information signalling means thereon, said information signalling means comprising first and second magnets polarized parallel to the axis of said carrier and selectively spaced from one another in a direction parallel to the axis of said carrier, said pneumatic tube and said carrier being of noncircular cross-sectional configuration such that said carrier maintains a preselected radial orientation as it travels through said pneumatic tube; information sensing means comprising a pair of sensing coil units mounted on said main pneumatic tube in predetermined spaced relationship with one another, each of said sensing coil units including at least one coil element comprising a high magnetic permeability coil frame having three spaced co-planar legs protruding perpendicularly from a common bar to form an E-shaped configuration, the middle one of said three spaced co-planar legs having a pickup coil encircled thereabout, one E-frame coil element being mounted on said main pneumatic tube with said three legs extending perpendicularly toward said main pneumatic tube and lying in a plane parallel to the axis of said main pneumatic tube, said one E-frame coil element being mounted on said main pneumatic tube such that said first and second magnets pass in close proximity thereto as said carrier travels through said main pneumatic tube in said preselected radial orientation, said first and second magnets each causing a reversal in flux direction in said middle leg of said E-shaped coil frame thereby inducing substantially a single peak voltage signal in said pickup coil of said one E-frame coil element upon passing by said one E-frame coil element when said carrier travels through said main pneumatic tube; circuit means connected to said pickup coils in said pair of sensing coil units including an AND gate for providing an output signal when voltage signals of predetermined polarities are induced simultaneously in said pickup coils; and a monostable multivibrator connected to the output of said AND gate for providing an output pulse of predetermined time duration upon receiving an output signal from said AND gate.

6. In a pneumatic tube system, the combination comprising: a pneumatic tube; a carrier adapted to travel in said pneumatic tube and including address information signalling means thereon, said information signalling means comprising first and second magnets polarized parallel to the axis of said carrier and selectively spaced from one another in a direction parallel to the axis of said carrier; information sensing means comprises a pair of sensing coil units mounted on said main pneumatic tube in predetermined spaced relationship with one another, each of said coil units including at least one coil element comprising a high magnetic permeability coil frame having three spaced co-planar legs protruding perpendicularly from a common bar to form an E-shaped configuration, the middle one of said three spaced co-planar legs having a pickup coil encircled thereabout, each of said coil units further comprising three separate bands of high magnetic permeability encirculing said main pneumatic tube in predetermined spaced relationship with one another, each of said bands being connected to one of said legs of said one coil element so as to provide a magnetic flux path to said one leg, whereby said first and second magnets each cause a reversal of flux direction in said middle leg of said E-shaped coil frame to induce a substantially single peak voltage signal in said pickup coil of said one E-frame coil element upon passing through said three bands when said carrier travels through said main pneumatic tube circuit means connected to said pickup coils in said pair of sensing coil units including an AND gate for providing an output signal when voltage signals of predetermined polarities are induced simultaneously in said pickup coils; and a monostable multivibrator connected to the output of said AND gate for providing an output pulse of predetermined time duration upon receiving an output signal from said AND gate.

7. In a pneumatic tube system the combination comprising: at least one main pneumatic tube, a carrier for traveling through said main pneumatic tube, said carrier containing at least one signalling magnet mounted thereon and polarized parallel to the axis of said carrier, a coil unit mounted on said main pneumatic tube, said pickup coil unit including at least one coil element comprising a ferromagnetic coil frame having three spaced co-planar legs protruding perpendicularly from a common bar to form an E-shaped configuration, the middle one of said three legs having a pickup coil encircled thereabout, said one coil element being mounted on said main pneumatic tube with said legs extending perpendicular thereto and in a plane parallel to the axis of said main pneumatic tube, whereby said signalling magnet causes a reversal of flux direction in said middle leg of said E-shaped coil frame and thereby induces a substantially single peak voltage signal in said pickup coil when said signalling magnet passes by coil element in close proximity thereto.

8. In a pneumatic tube system the combination comprising: at least one main pneumatic tube, a carrier for traveling through said main pneumatic tube, said carrier containing at least one signalling magnet mounted on thereon and polarized parallel to the axis of said carrier, a coil unit mounted on said main pneumatic tube, said pickup coil unit including at least one coil element comprising a ferromagnetic coil frame having three spaced co-planar legs protruding perpendicularly from a common bar to form an E-shaped configuration, the middle one of said three legs having a pickup coil encircled thereabout, said coil unit further comprising three separate ferromagnetic bands encircling said main pneumatic tube in predetermined spaced relationship with one another, each of said bands being connected to one of sad legs of said one coil element so as to provide a magnetic flux path to said one leg, whereby said signalling magnet causes a reversal of flux direction in said middle leg of said E-shaped coil frame and thereby induces a substantially single peak voltage signal in said pickup coil when said carrier passes through said ferromagnetic bands.

References Cited

UNITED STATES PATENTS

| | | | |
|---|---|---|---|
| 2,877,718 | 3/1959 | Mittag | 243—16 |
| 2,970,791 | 2/1961 | Hafner | 243—16 |
| 3,055,611 | 9/1962 | Stout | 243—16 |
| 3,152,681 | 10/1964 | Byrnes | 243—16 |
| 3,219,989 | 11/1965 | Kuhrt | 243—16 |
| 3,222,577 | 12/1965 | Kennedy | 243—16 |
| 3,229,929 | 1/1966 | Thorburn | 243—16 |

ANDRES H. NIELSEN, *Primary Examiner.*

H. C. HORNSBY, *Assistant Examiner.*

UNITED STATES PATENT OFFICE
CERTIFICATE OF CORRECTION

Patent No. 3,332,639 July 25, 1967

William F. Joy

It is hereby certified that error appears in the above numbered patent requiring correction and that the said Letters Patent should read as corrected below.

In the drawings, Sheet 6, for "Fig. 17" read -- Fig. 18 --; and "Fig. 18" read -- Fig. 17 --; column 1, line 9, for "particulary" read -- particularly --; line 35, for "suitable" read -- suitably --; column 12, line 22, for "17" read -- 18 --; line 68, for "polarity" read -- polar --; column 14, lines 10 and 16, for "18", each occurrence, read -- 17 --; line 17, for "15" read -- 16 --; line 68, for "silicon controlled amplifier" read -- silicon controlled rectifier --; column 16, line 48, for "encirculing" read -- encircling --; column 17, line 14, strike out "on".

Signed and sealed this 9th day of July 1968.

(SEAL)
Attest:

EDWARD M. FLETCHER, JR.
Attesting Officer

EDWARD J. BRENNER
Commissioner of Patents